Sept. 14, 1965 L. KRAMER 3,205,681
COUPLING MEANS
Filed July 3, 1963 3 Sheets-Sheet 1

INVENTOR.
LEO KRAMER
BY
ATTORNEY

Sept. 14, 1965

L. KRAMER 3,205,681

COUPLING MEANS

Filed July 3, 1963

INVENTOR.
LEO KRAMER
BY
ATTORNEY

United States Patent Office 3,205,681
Patented Sept. 14, 1965

3,205,681
COUPLING MEANS
Leo Kramer, Athens, Pa., assignor to Ingersoll-Rand Company, New York, N.Y., a corporation of New Jersey
Filed July 3, 1963, Ser. No. 292,569
7 Claims. (Cl. 64—10)

This invention relates to fluid pumps and motors and more particularly to a coupling means for connecting a rotatable barrel to the cage of a fluid pump or motor.

Heretofore, as shown in United States applications Serial No. 214,593 (now Patent No. 3,116,698), filed August 3, 1962, by Leo Kramer, and Serial No. 214,079, filed August 1, 1962, by Leo Kramer (both of which applications are assigned to the same assignee as the present invention) the rotatable barrel of the pump and/or motor is coupled to the rotatable cage by means of a pin projecting from the barrel into a radial slot in the cage. This coupling means is similar to the coupling means shown in United States Patent #3,011,453 issued December 5, 1961 to Budzich, the Budzich device utilizing a pin projecting from a housing into an oversized hole in the barrel.

The problem in fluid pumps and/or motors is first to couple the barrel and cage together so that they rotate or index together without backlash or slippage, secondly, that the cage cavities align with their respective piston bores, and thirdly, that the abutting surfaces of the barrel and stationary valve plate engage in fluid seal contact. Unless the barrel is permitted to tilt during its rotation with the cage, fluid leakage occurs between the abutting surfaces of the stationary valve plate and the barrel.

It is the general object of the present invention to avoid and overcome the foregoing and other difficulties of and objections to prior art practices by the provision of an improved coupling means for coupling the barrel of a fluid pump and/or motor to the cage, which coupling means permits the barrel and cage to rotate or index together without backlash or slippage.

Another object of the present invention is an improved coupling device which aligns the piston bores in the barrel with the cage cavities.

A further object of the present invention is an improved coupling device which permits the rotating barrel to oscillate with respect to the cage thereby permitting the barrel to seat itself in sealing contact against the stationary valve plate.

The aforesaid objects of the present invention, and other objects which will become apparent as the description proceeds, are achieved by providing a coupling device for coupling a first rotatable member of a fluid operated apparatus to a second rotatable member of the fluid operated apparatus. The coupling device comprises an oscillatable member rotatable in one of the first rotatable member and the second rotatable member. The oscillatable member is provided with a keying aperture. The one is provided with a clearance aperture communicating with the oscillatable member. A keying member projects from the other of the first rotatable member and the second rotatable member through the clearance aperture and into the keying aperture to provide positive driving coupling between the first rotatable member and the second rotatable member and to permit relative oscillatory movement between the first rotatable member and the second rotatable member during rotation therebetween.

For a better understanding of the present invention, reference should be had to the accompanying drawings, wherein like numerals of reference indicate similar parts throughout the several views and wherein:

FIG. 1 is a vertical sectional view of a fluid pump or motor incorporating the improved coupling means of the present invention;

FIG. 1-A is a fragmentary sectional view of the coupling means taken along the line 1A—1A of FIG. 1 in the direction of the arrows;

Although the principles of the present invention are broadly applicable to fluid operated apparatus, such as fluid pumps and/or motors, the present invention is particularly adapted for use in conjunction with an improved coupling means for a fluid pump and/or motor and hence it has been so illustrated and will be so described.

Figures 1, 1A:
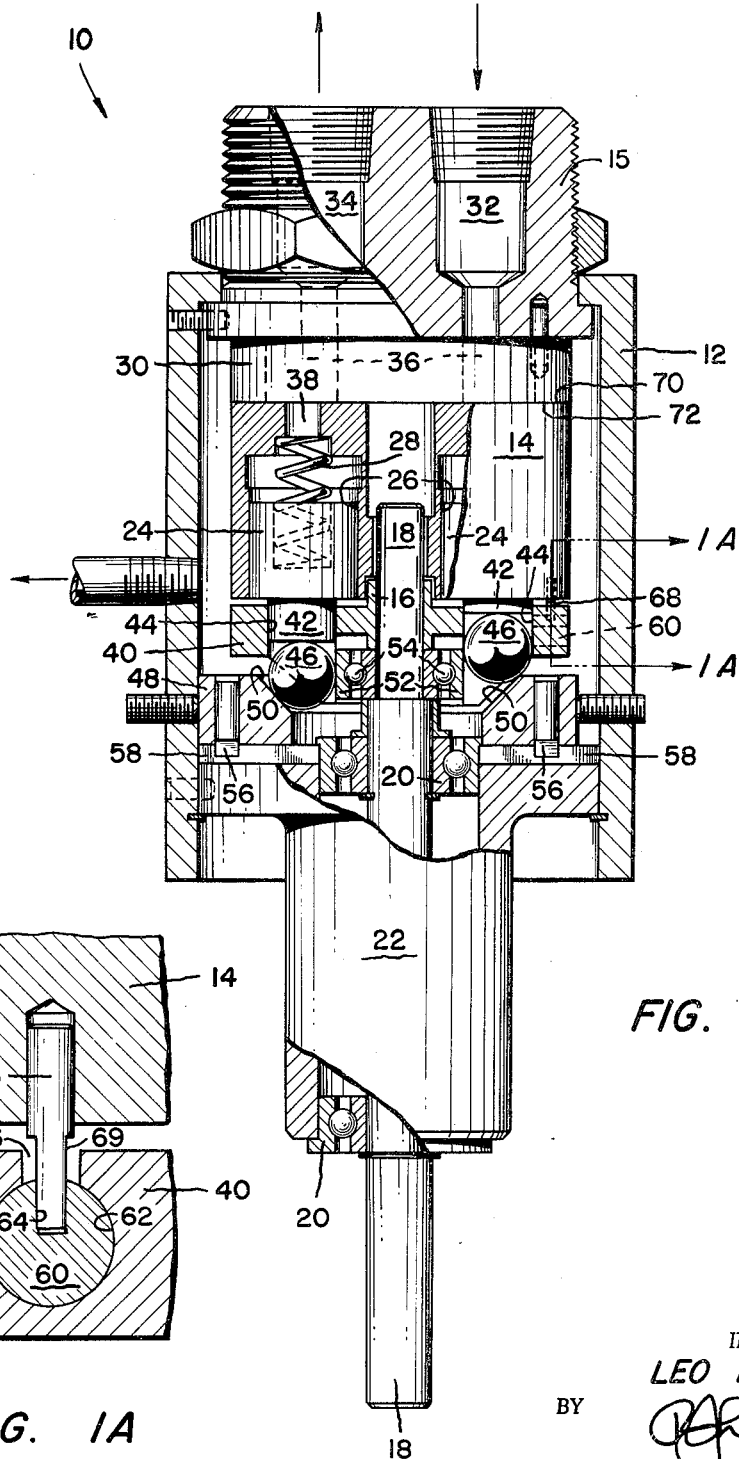

With specific reference to the form of the present invention illustrated in the drawings, and referring particularly to FIG. 1, a fluid operated apparatus, such as a fluid pump or motor, is indicated generally by the reference numeral 10.

Since the fluid pump or motor 10 is of the type disclosed in the above-mentioned U.S. application Serial No. 214,593 and per se forms no part of the present invention, it is deemed sufficient to describe such pump or motor 10 briefly.

Figure 2:
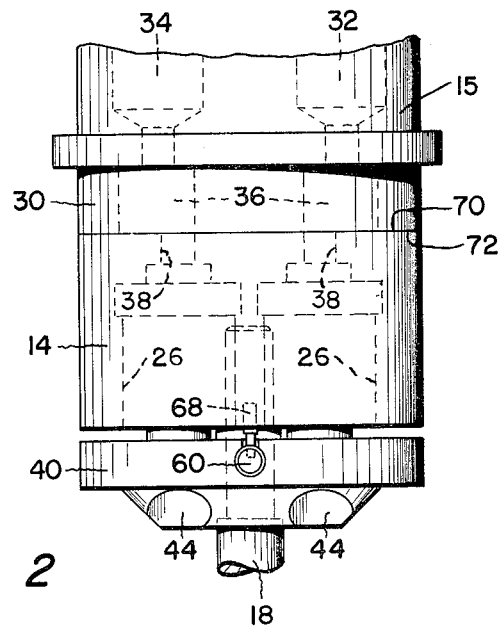
FIG. 2 is a side elevational view of the stationary valve plate, rotatable barrel and cage and the improved coupling means of the present invention, wherein the oscillatable member is carried by the cage.
Figure 3:
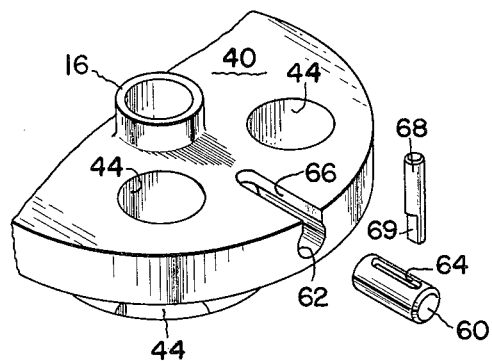
FIG. 3 is a fragmentary perspective view of a portion of the cage with the two pins of the coupling means shown in exploded position.

As shown in FIG. 1, the fluid pump or motor 10 includes a stationary housing 12 of a stationary housing means containing a first rotatable member, such as a rotating barrel 14 (FIGS. 1, 1A and 2), keyed and flexibly supported at 16 (FIGS. 1 and 3) on a shaft 18 (FIGS. 1 and 2), projecting forward from the front end of the barrel 14. The shaft 18 is rotatably mounted in bearings 20 (FIG. 1) fixed in a cylindrical nose 22 (FIG. 1), which nose 22 forms a part of the stationary housing means.

A series of axially reciprocating pistons 24 (FIG. 1) are slidably mounted in corresponding piston bores 26 (FIGS. 1 and 2), formed in the rotating barrel 14. The pistons 24 are biased forwardly in their bores 26 by respective springs 28 (FIG. 1). The upper surface 70 (FIGS. 1 and 2) on the rear end of the barrel 14 seats against a lower surface 72 (FIGS. 1 and 2) on a stationary circular valve plate 30 (FIGS. 1 and 2) having an inlet port 32 (FIGS. 1 and 2) and outlet port 34 (FIGS. 1 and 2) for admitting and discharging fluid into and from grooves 36 (FIGS. 1 and 2) in the stationary valve plate 30 and the rear ends 38 (FIGS. 1 and 2) of the bores 26, as the barrel 14 rotates with the shaft 18.

The stationary valve plate 30 is held in place against the rear end of the barrel 14 by an end plate 15 (FIGS. 1 and 2) of the stationary housing means.

A second rotatable member, such as an apertured cage 40 (FIGS. 1-3), which is located at the front end of the barrel 14, as viewed in FIG. 1, and rotates with the barrel 14 by means of the improved coupling means of the present invention. Each of the pistons 24 have a stem 42 (FIG. 1) at their front ends, which stems 42 project into corresponding apertures, such as ball cavities 44 (FIGS. 1-3), in the cage 40 and seat on balls 46 (FIG. 1) contained in the cavities 44.

A stationary conical ring 48 (FIG. 1) is located at the front face of the cage 40 and has a conical inner peripheral surface 50 (FIG. 1) which surface 50 is inclined inwardly and forwardly of the barrel 14. The balls 46 in the cage 40 ride on the conical inner peripheral surface 50 of the ring 48 and also on an outer race 52 (FIG. 1) of a ball bearing 54 (FIG. 1) mounted on the shaft 18 in the center of the conical ring 48. The conical ring 48 is mounted on or keyed to the cylindrical nose 22 to slide back and forth in a diametrical direction, relative to and in a plane located at right angles to the rotary axis of the barrel 14. This keying function is performed by the key 56 (FIG. 1) sliding in the diametrical groove 58 (FIG. 1), formed in the rear face of the cylindrical nose 22.

When the conical ring 48 (FIG. 1) is positioned eccentric to the axis of the barrel 14, the pistons 24 are caused to reciprocate in the barrel 14 as it revolves and the stroke length of the pistons 24 is varied by changing the eccentricity of the conical ring 48 with respect to the rotary axis of the barrel 14.

*Coupling means*

The coupling device or means of the present invention is employed for coupling a first rotatable member, such as the barrel 14 (FIGS. 1, 1-A), of a fluid operated apparatus, such as the fluid pump or motor 10, to a second rotatable member, such as the cage 40. The coupling device (FIGS. 1-3) has an oscillatable member, such as the oscillatable pin 60, rotatable in one or either of the barrel 14 and the cage 40. In this case the oscillatable pin 60 rotates in a radial bore 62 (FIGS. 1-A, 2, 3) in the cage 40. The oscillatable pin 60 is provided with a keying aperture, such as the keying slot 64 (FIGS. 1-A, 3). In addition, the cage 40 is provided with a clearance aperture, such as the clearance slot 66 (FIGS. 1-A, 3) which slot 66 communicates with the radial bore 62 and the oscillatable pin 60.

A keying member, such as keying pin 68 (FIGS. 1-A, 2, 3), projects from the barrel 14 through the clearance slot 66 and into the keying slot 64 to provide positive driving coupling between the barrel 14 and cage 40 and also to permit relative oscillatory movement between the barrel 14 and cage 40 during rotation therebetween. As a result of this permitted oscillatory movement, the upper surface 70 (FIGS. 1-2) of the rotating barrel 14 can seat in fluid sealing engagement with the lower surface 72 of the stationary valve plate 30. The keying pin 68 has a tang portion 69 (FIGS. 1-A, 3) which tang portion 69 provides surface contact (rather than line contact) with the side walls of the keying slot 64, thereby increasing the load carrying capabilities of the coupling means.

*Alternative embodiments*

Figure 4:
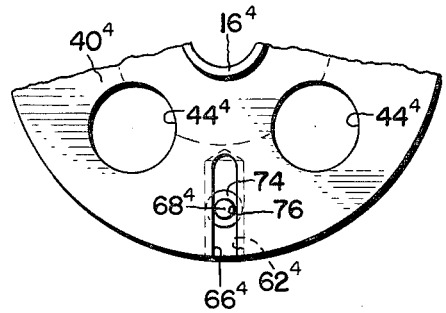
FIG. 4 is an enlarged fragmentary view similar to FIG. 3 showing the oscillatable member in the form of a sphere or ball.

It will be understood by those skilled in the art that alternatively as shown in FIG. 4, an oscillating member, such as the spherical ball bearing 74, provided with a keying aperture, such as a hole 76, may be used. Then keying pin 68⁴ slides vertically in the hole 76.

Figure 5:
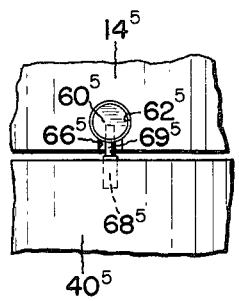
FIG. 5 is an enlarged fragmentary view similar to FIG. 2 showing the oscillatable member carried by the barrel.

In FIG. 5 the barrel 14⁵ carries an oscillating member, such as the oscillatable pin 60⁵, and the cage 40⁵ carries the keying member, such as the keying pin 68⁵.

Figure 6:
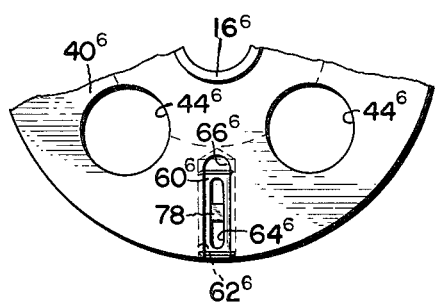
FIG. 6 is a view similar to FIG. 4 showing a bar as a keying member.

In FIG. 6, the keying member is a keying bar 78 projecting from the barrel (not shown).

It will be recognized by those skilled in the art that the objects of the present invention have been achieved by providing an improved coupling means for coupling the barrel of a fluid pump or motor to the cage, which coupling means permits the barrel and cage to rotate or index together without backlash or slippage, aligns the piston bores in the barrel with the cage cavities and permits the rotating barrel to oscillate with respect to the cage thereby permitting the barrel to seat itself in sealing contact against the stationary valve plate.

While in accordance with the patent statutes, preferred and alternative embodiments of the present invention have been illustrated and described in detail, it is to be particularly understood that the invention is not limited thereto or thereby.

I claim:

1. In combination, a pair of members disposed in end-to-end relationship for rotation on a common axis and a device for coupling the pair of members to each other for rotation in unison, comprising:
    (a) one of the pair of members having a bore with a clearance aperture through the end of such member adjacent the end of the other of the pair of members;
    (b) the bore being disposed radially to the common axis of rotation and spaced radially therefrom;
    (c) an oscillatable member movably disposed in the bore and having a keying aperture therein aligned with the clearance aperture;
    (d) the other of the pair of members having a recess bore parallel to the common axis which is open at its end adjacent the one of the pair of members and aligned with the clearance aperture;
    (e) a keying member disposed in the recess bore and extending therefrom through the clearance aperture and into the keying aperture; and
    (f) the keying member being movable axially in both the recess bore and keying aperture to permit oscillatory movement between the pair of members as they rotate.

2. The combination in accordance with claim 1, wherein said oscillatable member is a pin.

3. The combination in accordance with claim 1, wherein said oscillatable member is a ball.

4. The combination in accordance with claim 1, wherein said keying member is a pin.

5. The combination in accordance with claim 1, wherein said keying member is a bar.

6. The combination in accordance with claim 1, wherein said clearance aperture is a slot.

7. The combination in accordance with claim 1, wherein said keying aperture is a slot and the keying member is also movable in the slot radially relative to the common axis of rotation.

References Cited by the Examiner

UNITED STATES PATENTS

| | | | |
|---|---|---|---|
| 847,439 | 3/07 | Ritter | 64—10 |
| 901,080 | 10/18 | Dock | 64—10 |
| 1,788,741 | 1/31 | Reedy | 64—10 |
| 2,612,764 | 10/52 | Wilken | 64—10 X |

FOREIGN PATENTS

| | | |
|---|---|---|
| 501,183 | 1/20 | France. |
| 14,966 | 1912 | Great Britain. |
| 559,091 | 3/57 | Italy. |

BROUGHTON G. DURHAM, *Primary Examiner.*

ROBERT C. RIORDON, *Examiner.*